United States Patent [19]

Ferrieu

[11] 4,135,062
[45] Jan. 16, 1979

[54] ELECTRIC NETWORK FOR USE IN A SUBSCRIBER'S LOOP

[75] Inventor: Gilbert M. M. Ferrieu, Bievres, France

[73] Assignee: U.S. Philips Corporation, New York, N.Y.

[21] Appl. No.: 850,157

[22] Filed: Nov. 10, 1977

[30] Foreign Application Priority Data

Dec. 10, 1976 [FR] France .................. 76 37285

[51] Int. Cl.² ........................................... H04M 1/74
[52] U.S. Cl. .................................... 179/84 R; 179/77
[58] Field of Search ............... 179/77, 81 R, 18 F, 179/18 FA, 84 R, 84 A, 18 H, 18 B, 81 E; 307/297; 323/22 T

[56] References Cited

U.S. PATENT DOCUMENTS 3,969,591 7/1976 Sekiguchi .................. 179/81 R

FOREIGN PATENT DOCUMENTS

2254168 7/1975 France ........................................ 179/77

Primary Examiner—Thomas A. Robinson
Attorney, Agent, or Firm—Frank R. Trifari; Henry I. Steckler

[57] ABSTRACT

Electric network for use in a subscriber's loop, comprising at least two connecting terminals for supplying thereto a current flowing in the subscriber's loop, the network comprising the series arrangement of a capacitive element and a switching device and a threshold device coupled to the connecting terminals and the switching device for either coupling or not coupling, depending on the polarity and the value of said current, said capacitive element to the terminals of the network. This results in a network whose pattern of behavior is optimum for the various signals which are exchanged in the loop.

5 Claims, 12 Drawing Figures

ELECTRIC NETWORK FOR USE IN A SUBSCRIBER'S LOOP

The invention relates to an electric network for use in a subscriber's loop, comprising at least two terminals for supplying thereto a current flowing in the subscriber's loop, the network comprising a capacitive component.

To understand the various requirements such an electric network should satisfy the nature of the signals prevailing in a subscriber's loop are described here below.

If the receiver is on the hook, no direct current flows in the subscriber's loop and the subscriber's set is part of an open circuit. A ringing alternating current can then be transmitted from the central exchange to the subscriber's set to put the ringing device of the set into operation via a coupling capacitor which is arranged in the subscriber's set in series with the ringing device.

When the receiver is off-hook, a direct current flows in the loop for feeding the microphone of the set; Voice-frequency voice currents having a comparatively low amplitude of 1 to 2 mA are superimposed on this direct current which has, for example, a value of between 30 and 50 mA.

To form the number of the telephone subscriber he wishes to call up the calling subscriber produces by means of the dial of his set, the receiver of which he has removed from the hook, successive loop interruptions of a suitable number and rhythm, which consequently correspond to successive interruptions of the supply current of the set; these interruptions are detected by a suitable circuit which is coupled in the central exchange to the subscriber's loop.

From the above description of the signals occurring in a subscriber's loop it will be clear that the various electric or electronic components provided in the subscriber's loop will generally behave in a different manner for the different signals, depending on the frequency of said signals.

Such a component provided in the subscriber's loop, is, for example, formed by the windings of a calling relay which is used in the transmission bridge of a subscriber's set. The self-induction of each winding must have a low impedance for the supply current of the subscriber's set and for the currents used for the ringing device which have a frequency of 50 Hz, but, on the other hand, it must have a high impedance for the voice currents. In addition, the self-induction of said winding must not be so high that it opposes the successive interruptions and the reinstatement of the subscriber's loop by the dial of the set during dialling.

So it is evident that the choice of the value of this self-induction is a compromise between two different requirements: a high self-induction for a proper transmission of the voice currents and a low self-induction to prevent a considerable part of the ringing power from being absorbed and the dialling pulses from being excessively distorted.

As will be explained here below with reference to a number of examples it can in general be said that the electric networks which may have been provided in a subscriber's loop must also have different, suitably chosen impedance values for the various kinds of electric signals which are exchanged through said subscriber's loop. Because the price of a capacitor is much lower than the price of a self inductor, such electric networks will often comprise one or more capacitors for effecting different impedance values of said electric networks for the different kinds of signals considered. It is obvious that for similar reasons as those mentioned in connection with the self-induction of a calling relay in a transmission bridge, the choice of such capacitive components is based on a compromise between two extremes: a high capacitance value to obtain a very low impedance for the variable currents (ringing currents or voice currents) and a low capacitance value to prevent the dialling pulses from being distorted by charging and discharging transition phenomena of said capacitive elements during the successive interruptions and the reinstatement of the supply current.

The invention has for its object to provide an electric network of the type described in the preamble in which the necessity for such a compromise is avoided and wherein the optimum impedance for the various signals is automatically obtained.

The electric network according to the invention is therefore characterized in that said network furthermore comprises a switching arrangement included in series with the capacitive component and a threshold device coupled to the connecting terminals and the switching arrangement for coupling or not coupling in dependency on the polarity and the value of said current said capacitive component to the terminals of the network.

Said switching arrangement is preferably a pnp or npn-transistor whose collector-emitter path is used for coupling the capacitive component to the terminals of the network and whose emitter-base diode or collector-base diode is used as control element.

In this manner it is possible, thanks to the invention, to choose the capacitance value of the capacitive component or of the capacitive components to be very high, which is necessary for obtaining the impedance required for the network for the high-frequency currents, such as the voice currents, without the charging and discharging effects of said capacitive elements occurring during the dialling pulses, being able to distort said dialling pulses: for, when these capacitive components have been charged by the supply current, the receiver being off-hook, they cannot discharge themselves during the dialling pulses as said components are switched off during the loop openings caused by the dial.

Embodiments of the network according to the invention will now be explained with reference to the drawing in which.

Figure 1:
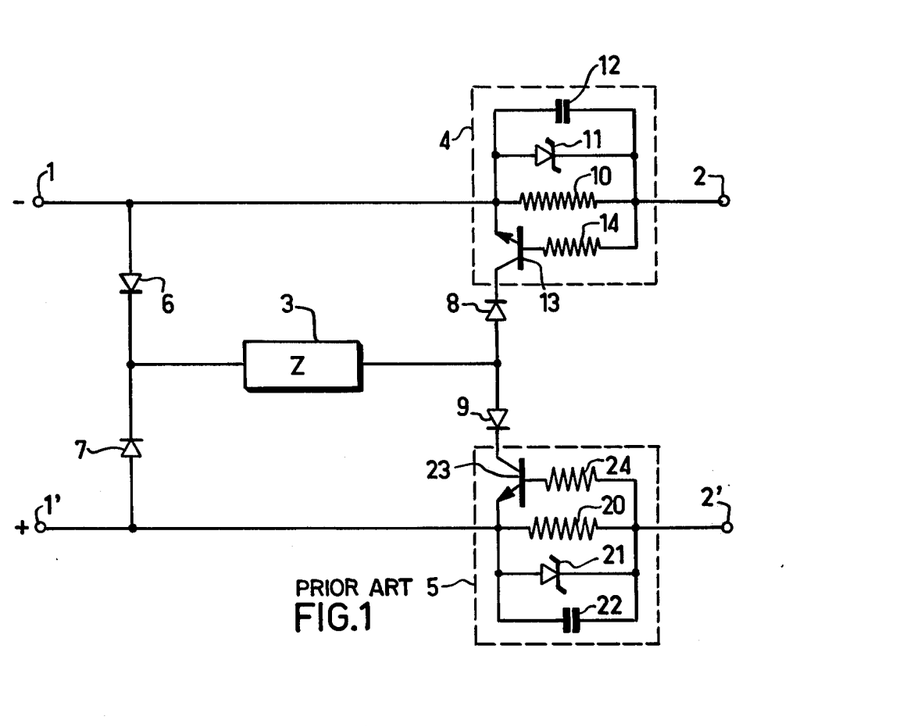
FIG. 1 shows the circuit diagram of a prior art arrangement for supplying a low current to a telephone set, said arrangement comprising two electric networks to which the invention applies.

FIG. 1 shows by way of example an arrangement provided with electric networks to which the invention can be applied. This prior art arrangement is described in an article by J. M. Person, entitled "Système d'abonnés à courant réduit" which appeared in "L'écho des recherches", pages 58 to 65, July 1974. Such an arrangement which is intended for use in a subscriber's loop enables the adaptation of the admittance which forms the subscriber's line for the telephone exchange, relative to the voice current and also allows the feeding of the subscriber's set, the current being either decreased or not decreased.

Said arrangement is provided with terminals 1, 1' which are connected to the telephone exchange and with terminals 2, 2' which are connected to the subscriber's line. The circuit 3 forms a resistive impedance for the direct current passing through it and, simultaneously, a negative impedance for the voice currents. The circuits 4 and 5 are devices by means of which it is possible to tap off a portion of the supply current supplied by the telephone exchange in such a manner that said portion flows through the circuit 3. The use of the diodes 6, 7, 8 and 9 enables such an orientation of said current portion that said portion always flows in the same direction through the impedance Z of the circuit 3 if the polarity of the voltage which is supplied by the transmission bridge of the telephone exchange to the terminals 1, 1' is reversed.

The circuits 4 and 5 comprise components which are connected in the same manner. The circuit 4 (5 respectively) comprises a resistor 10 (20) provided between the terminals 1, 2 (1', 2'), a Zener diode 11 (21) and a capacitor 12 (22) which are each connected to the terminals of the resistor 10 (20). The emitter electrode of the npn transistor 13 (23) is connected to the terminal of the resistor 10 (20) which is connected to the terminal 1 (1'), the collector electrode is connected to diode 8 (9) and the base electrode is connected via resistor 14 (24) to the other terminal of resistor 10 (20).

If the voltage supplied by the transmission bridge of the exchange to the terminals 1, 1' has the polarity indicated in FIG. 1 (at 1 and at 1') the arrangement operates in the following manner: if the subscriber's loop connected to the terminals 2, 2' is closed (receiver off-hook) a current flows through resistor 10 which current is such that transistor is saturated. A tapped-off current can then flow through diode 7, impedance Z of the circuit 3, diode 8 and the collector-emitter path of transistor 13. The current which flows through the subscriber's set passes the resistor 20, however in a direction which is such that the transistor 23 is non-conducting. The capacitors 12 and 22 ensure decoupling of the resistors 10 and 20 for the variable current. Zener diode 11 and resistor 14 are used for limiting the current in the base-emitter path of transistor 13. As the circuits 4 and 5 are identical, it is obvious that if the polarity of the voltage applied to the terminals 1 and 1' is reversed the operation of the arrangement in FIG. 1 remains the same, the function of the components 4, 7 and 8 and the function of the components 5, 6 and 9 being interchanged.

If the subscriber's loop is open (receiver on-hook) and the subscriber is called from the exchange, a 50 Hz a.c. voltage appears at the terminals 1, 1'. In the ringing device of the set this a.c. voltage produces a current which flows through the capacitors 12 and 22, the voltage drop across these capacitors must then be sufficiently small to prevent the transistors 13 and 23 from becoming conducting. To this end the capacitance of the capacitors 12 and 22 must be high in order to prevent excessive charging of said capacitors during each half cycle of the 50 Hz signal.

The use of capacitors of a high capacitance value has, however, a marked drawback during dialling. The capacitor 12, which is charged to a voltage of approximately 0.7 V by the passage of the loop current in the resistor 10 needs a certain period of time to discharge to a voltage which is below the threshold voltage at which the transistor 13 becomes non-conducting. This means that, in spite of the fact that the loop is open during the loop interruption pulse, the transistor 13 will remain conducting during a given period of time, so that a direct current can flow through diode 7, impedance Z, diode 8 and the collector-emitter path of transistor 13. The dialling pulses received in the exchange may then be distorted to an annoying degree.

Alternatively, if the capacitance values of capacitors 12 and 22 are sufficiently low to obviate said drawback, the transistors 13 and 23 may be made conducting at the peak values of the ringing current. If particularly those transistors 13 and 23 do not become conducting in the presence of precisely the same main current in the subscriber's loop, the peak ringing currents tapped off by the transistors 13 and 23 may be different from one another which results in an average direct current differing from zero in the transmission bridge of the exchange, so that it is possible that the exchange incorrectly interprets said direct current as the lifting of the receiver from the hook of the subscriber's set.

The circuits 4 and 5 may be considered as electric networks provided with capacitive components 12 and 22, and connected into a subscriber's loop via terminals 1, 2 and 1', 2' and wherein the measures according to the invention can be applied to obviate the above-mentioned drawbacks.

Figure 2:
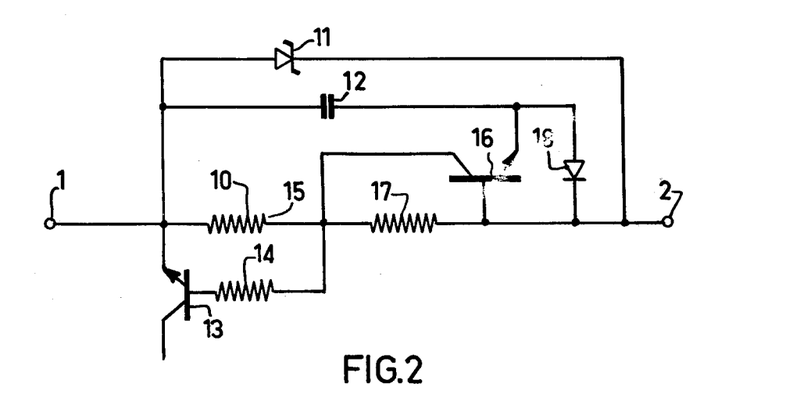
FIG. 2 shows the circuit diagram of an electric network according to the invention suitable for use with the arrangement shown in FIG. 1.

FIG. 2 shows the circuit diagram of, for example, the electric network 4, adapted in accordance with the invention. Said circuit diagram also shows the resistor 10, one end of which is connected to the terminal 1, the transistor 13, the emitter electrode of which is connected to terminal 1 and whose base electrode is connected via resistor 14 to the other end 15 of resistor 10, zener diode 11, which is included between the terminals 1 and 2 and capacitor 12, one end of which is connected to terminal 1. In order to connect the other end of capacitor 12 into the network, a switching device, constituted by the npn transistor 16 and controlled by the current through resistor 17 was added; resistor 17 is provided between the ends 15 of resistor 10 and terminal 2. The base electrode of the transistor 16 is connected to terminal 2 and the collectrode electrode to the end 15, whereas one end of the emitter electrode of said transistor is connected to the other end of capacitor 12 and the other end to terminal 2 through diode 18.

If a loop current flows from terminal 2 to terminal 1 with such a value that the voltage drop across resistor 17 adjusts the transistor 16 to the saturation state the emitter-collector path of this transistor constitutes virtually a short circuit and everything proceeds as if capacitor 12 were connected to the terminals of resistor 10.

If the subscriber's loop is open the current in the resistor 17 becomes equal to zero and transistor 16 is non-conducting, which prevents capacitor 12 from discharging into the resistor 10, so that transistor 13 remains conducting during said time period as indicated in FIG. 1. If the loop is reclosed after each interruption, the loop current is immediately restored in resistor 17, transistor 16 becomes conducting and capacitor 12, which has retained its charge during interruption of the loop, is again connected to the terminals of resistor 10.

Thus, owing to the presence of the switching device constituted by transistor 16 and of resistor 17 in the network of FIG. 2 it is possible to use a capacitor 12 of a very high capacitance without it being possible that during dialling the annoying hysteresis effect, caused by the fact that the transistor 13 is rendered alternatingly non-conducting and conducting can occur.

In the ringing phase the 50 Hz ringing currents pass for a given current flow direction the capacitor 12 and the emitter-base path of transistor 16 and for the other current flow direction the capacitor 12 and the diode 18 provided for that purpose. The capacitor 12, whose capacitance is high, cannot take up any worthwhile charge in each half cycle of the ringing current. If particularly the current flows from terminal 2 to terminal 1 the voltage between the terminals 2 and 1 is substantially equal to the voltage drop in the base-emitter diode of transistor 16, so approximately 0.6 V. This voltage is too weak to cause the series-arranged base-collector diode of transistor 16 and the base-emitter diode of transistor 13 to become conducting, so transistor 13 remains cut-off and in the circuit according to FIG. 1 no current of 50 Hz frequency is discharged to the circuit 3.

In the circuit shown in FIG. 2 the zener diode 11 is not connected to the terminals of the resistor 10 but to the terminals of the series arrangement of resistors 10 and 17; in this manner said zener diode has a protective function both for the base-emitter diode of transistor 13 and for the base-collector diode of transistor 16.

In order to prove the general usability of the invention, a further example of the application of the invention will be described. To one skilled in the art it is known that it is possible to realize an active RC-network which has about the same characteristics as a self induction. Such a network can be used advantageously, for example for realizing the self induction in a transmission bridge for the subscriber's loop.

Figure 3:
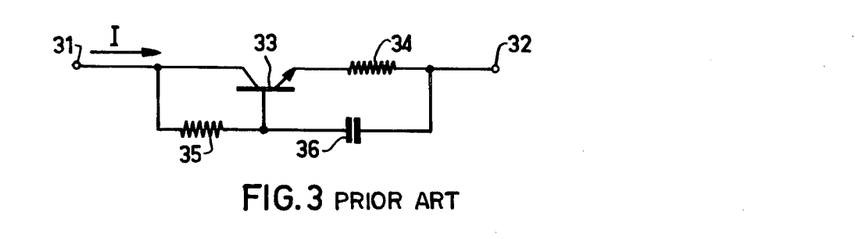
FIG. 3 shows the prior art circuit diagram of an active RC network whose characteristics resemble those of a self induction.

FIG. 3 shows the conventional circuit diagram of such an "electronic self induction". Said diagram shows an electric network comprising two terminals 31 and 32 and a transistor 33 whose collector electrode is connected to terminal 31, the emitter electrode through a resistor 34 to terminal 32 and the base electrode via a resistor 35 to the terminal 31. Furthermore a capacitor 36 is provided between the base electrode of transistor 33 and terminal 32.

For direct current said circuit operates as follows: the current I which flows from terminal 31 to terminal 32 produces a base current $I/(b+1)$ in resistor 35, b being the current gain coefficient of transistor 33. If the ohmic value of the resistors 34 and 35 is indicated by $R_4$ and $R_5$ the voltage drop between the terminals 31 and 32 is given by $$(R_4 + \frac{R_5}{b+1})I + v_e,$$

$v_e$ being the voltage of the forward polarized base-emitter diode. The collector electrode of transistor 33 is polarized in a simple manner by the voltage drop $R_5/(b+1) I$ across the resistor 35. If $R_4$ is small and b is large, it is obvious that the d.c. voltage drop between the terminals 31 and 32 can be very low, to the order of 2 to 3 volts, even if the current I is relatively large. If, for example, $R_4 = 33$ ohm, $b = 199$, $R_5 = 6.6$ kOhm, $v_e = 0.6V$ and $I = 30$ mA, the voltage drop between the terminals 31 and 32 amounts to approximately 2.6 V, that is to say it is comparable to a voltage drop occurring with a similar current across the self induction of a transmission bridge.

Capacitor 36 forms a sort of short circuit for voice frequencies, whereas the impedance of the circuit becomes substantially equal to that of the pure resistor 35.

Figure 4:
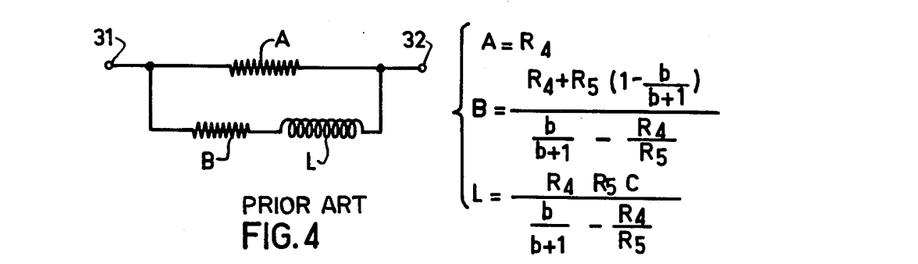
FIG. 4 is an equivalent circuit diagram of the network shown in FIG. 3, the components being expressed as a function of the components of the latter network.

In particular it can be proved that the circuit shown in FIG. 3 approximately behaves as the equivalent circuit shown in FIG. 4, wherein the parallel arrangement of a resistor A with the series arrangement of a resistor B and a self induction L is provided between the terminals 31 and 32. In FIG. 4 the values of the components A, B and L are indicated as a function of the values of the several components of FIG. 3: The values $R_4$ and $R_5$ of the resistors 34 and 35, capacitance C of condensator 36 and current gain coefficient b of the transistor 33.

Figure 5:
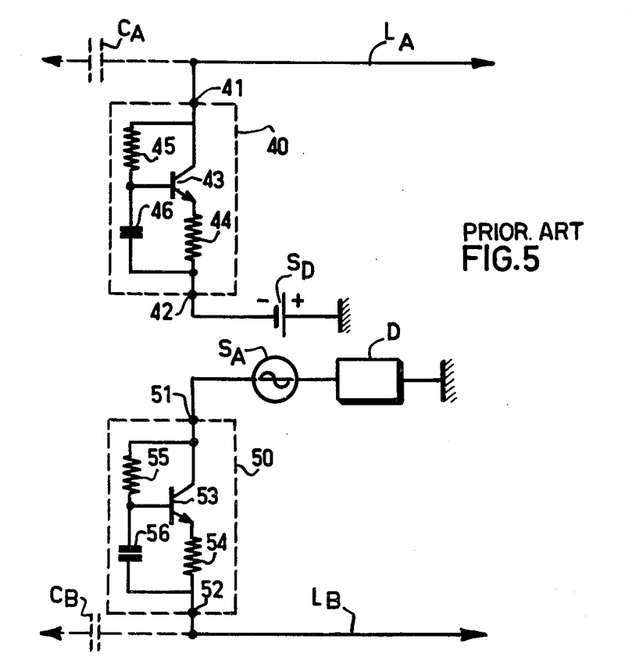
FIG. 5 shows the circuit diagram of a transmission bridge for a subscriber's set having two electric networks as shown in FIG. 3.

As indicated above the circuit shown in FIG. 3 can be used to replace the self induction in the transmission bridge of a subscriber's loop, as shown in FIG. 5. This FIG. 5 shows the prior art arrangement of such a transmission bridge wherein the two circuits 40 and 50, which comprise the same components which are disposed in the same manner as in the network shown in FIG. 3, replace the two conventional self inductions which are provided in series on the two wires $L_A$ and $L_B$ of the subscriber's line. The two terminals 41 and 42 of the circuit 40 and the two terminals 51 and 52 of the circuit 50 correspond to the two terminals 31 and 32 of the network shown in FIG. 3. The components 43 to 46 of the circuit 40 and the components 53 to 56 of the circuit 50 correspond to the components 33 to 36 of the network shown in FIG. 3. The terminal 41 of circuit 40 is connected to the subscriber's set through the wire $L_A$, the other terminal 42 of the circuit 40 being connected through the negative pole of a d.c. voltage source $S_D$ which supplies a 48 V supply voltage and whose positive pole is connected to earth. Arranged between earth and terminal 51 of the circuit 50 there are a device D for detecting the presence of a loop current when the subscriber lifts the receiver from the hook and a source $S_A$ for supplying the 50 Hz ringing signals. The other terminal 52 of the circuit 50 is connected to the subscriber's set through the wire $L_B$.

In the diagram the capacitors $C_A$ and $C_B$ for coupling the telephone exchange are indicated by means of dashed lines, an electrode of said capacitors being connected to terminals 41 and 52 respectively.

The circuits 40 and 50, whose components have the value specified above relative to the circuit shown in FIG. 3, produce a small voltage drop (approximately 2.6 V) for a supply current of 30 mA; in contradistinction therewith said circuits have an impedance which is sufficiently large (approximately 6600 ohm) to avoid that for the voice currents the impedance of the subscriber's line, which is approximately 600 ohm, is arranged in parallel. Said impedance is obtained by giving the capacitors 46 and 56 such a high capacitance that the impedance is very small compared with the value of the resistors 44 and 54.

On dialling, the circuits 40 and 50, which in accordance with the equivalent diagram of FIG. 4 behave as self inductions will oppose the rapid interruption and reinstatement of the loop current, which might disturb the operation of the device D.

In accordance with the invention these self induction effects are avoided during dialling by preventing the discharging and recharging of the capacitors 46 and 56 in the rhythm of the loop interruptions on dialling.

Figure 6:
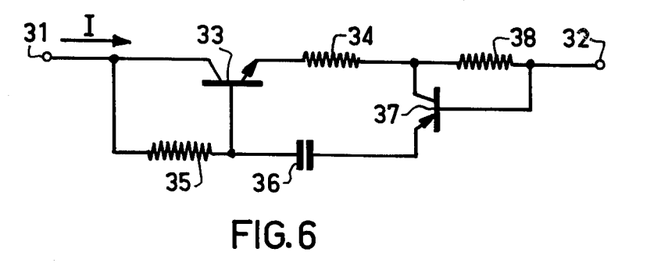
FIG. 6 shows a circuit diagram corresponding to the diagram shown in FIG. 3 of a network according to the invention.

FIG. 6 shows the network shown in FIG. 3 after it was changed in accordance with the invention and can be used for replacing the circuits 40 and 50 of FIG. 5. The network shown in FIG. 6 comprises, just like the network of FIG. 3 the transistor 33 whose collector electrode is connected to terminal 31, one end of whose base electrode is connected via resistor 35 to terminal 31 and the other end to an end of capacitor 36 and whose emitter electrode is, finally, connected to an end of resistor 34. In this diagram, however, the other end of capacitor 36 and the other end of resistor 34 are not interconnected directly but via the emitter-collector path of the pnp transistor 37 whose emitter and collector are connected to the other end of capacitor 36 and the other end of resistor 34 respectively. A resistor 38, whose two ends are connected to the collector and the base respectively of transistor 37 is included between this resistor 34 and terminal 32 of the network. It is clear that in this manner the release threshold of transistor 37 is controlled by the voltage drop across the terminals of resistor 38.

If the loop current I flows in the network from terminal 31 to terminal 32, said current causes a voltage drop across resistor 38. If this voltage drop is sufficient to release the transistor 37, this transistor is brought to the saturation state and the impedance of this transistor between the collector and the emitter becomes very small; everything then behaves as if capacitor 36 were connected directly to the terminals of the resistor 34. So for the voice currents superimposed on the supply current of the set the circuit functions as the "electronic self induction" of FIG. 3.

On dialling and at the moment a loop interruption occurs, the current I will, on the contrary, decrease rapidly to a value which is below the release threshold of transistor 37. At this moment the capacitor 37 is in an insulated position and retains its charge, the network of FIG. 6 then corresponding to a small resistance. On reclosing of the loop, the current I will adjust substantially immediately to a value equal to the threshold value of the release currents of transistor 37 and will slowly increase thereafter.

An optimum threshold value of said current is given by the difference between the specified minimum value of the supply direct current of the subscriber's set and the specified maximum value of the voice current in the subscriber's loop.

Figure 7:
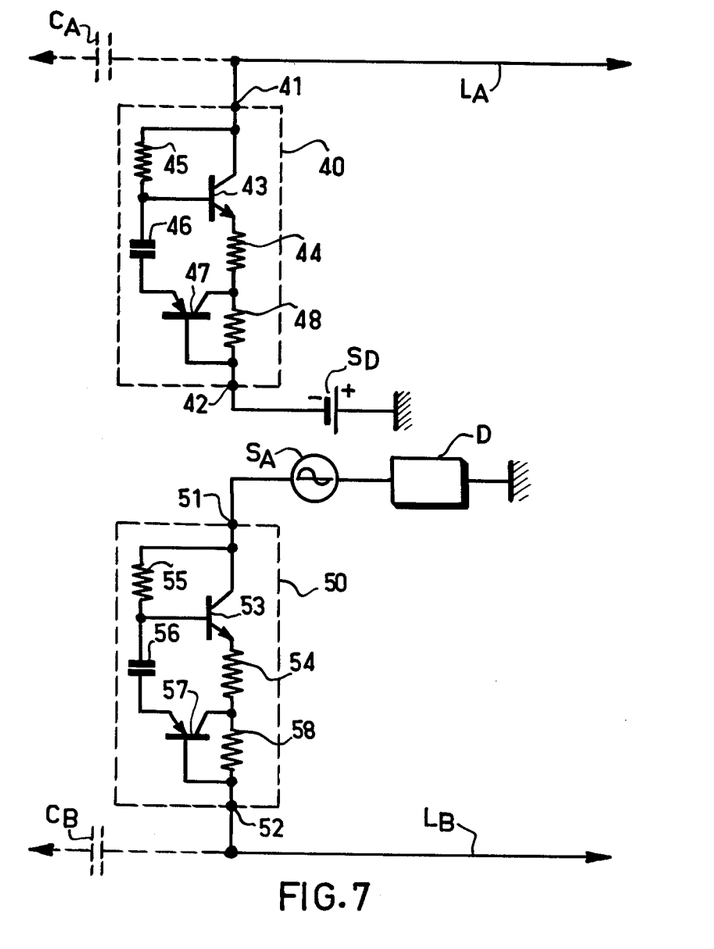
FIG. 7 shows a circuit diagram of a transmission bridge for a subscriber's set having two electric networks as shown in FIG. 6.

FIG. 7 shows the diagram of the transmission bridge of FIG. 5 wherein, in accordance with the invention, each of the networks 40 and 50 is replaced by a network of FIG. 6. In FIG. 7 the elements corresponding with the elements of FIG. 5 have been given the same reference numerals. In addition, the networks 40 and 50 comprise in the diagram of FIG. 7 the transistors 47 and 57 and the resistors 48 and 58 which, relative to the other elements, are connected in like manner as transistor 37 and transistor 38 in the network of FIG. 6.

Figure 8:
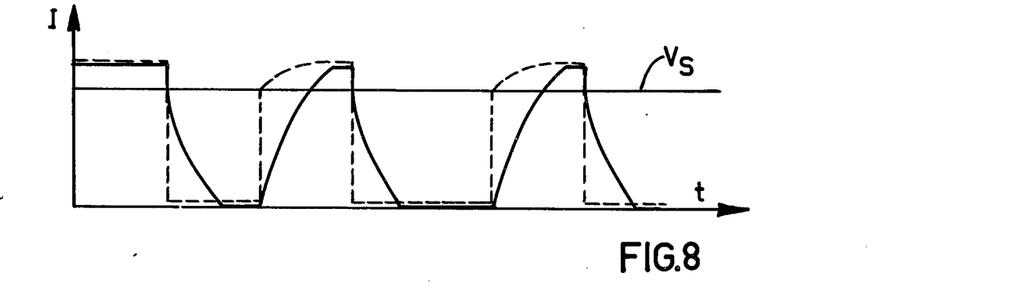
FIG. 8 is a time diagram which shows the variation in the dial pulses in the case the loop is supplied by the bridge shown in FIG. 5 or FIG. 7.

In the time diagram of FIG. 8 the solid curve represents the loop current as it is measured by the device D in the case of FIG. 5, whereas the dashed curve represents the loop current as it is measured by the device D in the case of FIG. 7. The horizontal line $V_S$ represents the release threshold of the transistors 47 and 57. It is evident that in the first case the dialling current pulses are greatly distorted and that in the second case, where networks according to the invention are used, said current pulses are shown to be almost perfect for interrupting and reclosing the loop.

Figure 9:
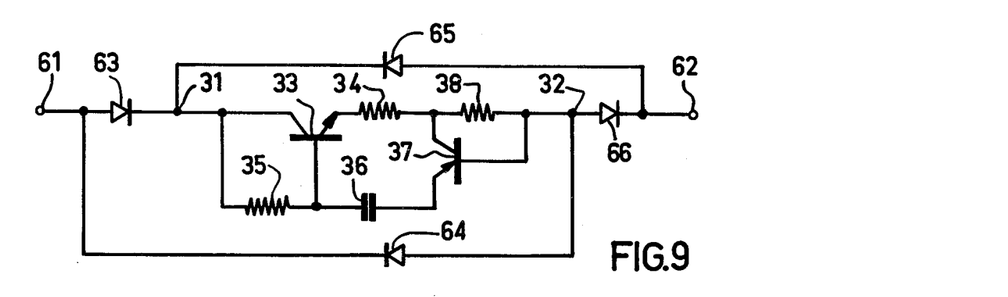
FIG. 9 shows an electric network according to the invention which is derived from the network shown in FIG. 6 and whose operation is independent of the polarity of the current flowing through it.

In a further mode of operation the circuits 40 and 50 of FIG. 7 can be subjected to the 50 Hz ringing signals applied by the generator $S_A$. In order to obtain the proper operation of said circuits the network of FIG. 6 is used, which is identical to each of the said circuits, it being assumed that a ringing signal is supplied to the terminals of said network. During half a cycle the ringing current will flow from terminal 31 to terminal 32 and that, presuming capacitor 36 is discharged, through resistor 35, capacitor 36 and the base-emitter diode of transistor 37. If capacitor 36 is charged to a voltage which exceeds the voltage at which the base-emitter diode of transistor 33 becomes conducting, this transistor 33 starts conducting and the impedance of the network of FIG. 6 will quickly decrease to a value which is equal to the direct current resistance of the circuit because the peak ringing current which is much smaller than the loop current will not keep the switching device 37 in the closed state. Capacitor 36 remains isolated, a voltage of approximately a diode voltage, that is to say 0.6 to 0.7 volts, being present between its terminal. During the other half cycle, however, the ringing current will flow from terminal 32 to terminal 31 and the current will flow through one of the following two paths: resistor 38, resistor 34, emitter-base diode of transistor 33, which functions as a zener diode, and the base-collector diode of transistor 33 or, alternatively, the base-emitter diode of transistor 37 which functions as a zener diode, capacitor 36 and the base-collector diode of transistor 33. The first of said paths must be preferred to said second path, to avoid discharging of capacitor 36 during this half cycle. This means that the zener voltage of the emitter-base diode of transistor 33 must be smaller than the zener voltage of the base-emitter diode of transistor 37, reduced by the voltage picked up by the capacitor 36 during the other half cycle. In these circumstances the network of FIG. 6 behaves for a current flowing from terminal 32 to terminal 31 as a zener diode in series with a diode and two small resistors. The operation of the network of FIG. 6 is not the same for every half cycle of the current. One skilled in the art will easily understand that it can be interesting to arrange the network of FIG. 6 in such a way that it operates in an identical manner for both half cycles of the ringing current. This can be realized by means of the circuit of FIG. 9 in which all the elements of the network of FIG. 6 are present, provided with the same reference numerals, between the terminals 31 and 32. The network of FIG. 9 is provided with two terminals 61 and 62 and comprises four diodes 63 to 66 inclusive which are connected in known manner to the terminals 31, 32 and 61, 62 for forming a rectifier bridge which forces the current to flow in a certain direction between the terminals 31 and 32, independent of the current flow between the terminals 61 and 62.

Such a network can be arranged in the transmission bridge circuit of FIG. 7 instead of the networks 40 and 50, which furnishes the advantage that the operation of the circuit of FIG. 7 is independent of the polarity of the voltage source $S_D$.

The network of FIG. 6 utilizes a pnp transistor 37 by way of switching device. For one skilled in the art it will be evident that it is likewise possible to use a npn transistor. Of this npn transistor the emitter would then be connected to the capacitor 36, the collector to terminal 32 and the base to the junction of the resistors 34 and 38.

It should be noted that with the transistor constituting the switching device an "inverse" circuit is preferably used, wherein the role of the emitter and the collector are mutually interchanged compared with the normal use of a transistor in the saturation state. The advantage thereof is that in the saturation state the d.c. voltage between the collector and the emitter closely approaches the value zero, whereas this voltage is usually less well-defined and can increase for large base-emitter currents to 0.3 V or higher.

Figure 10:
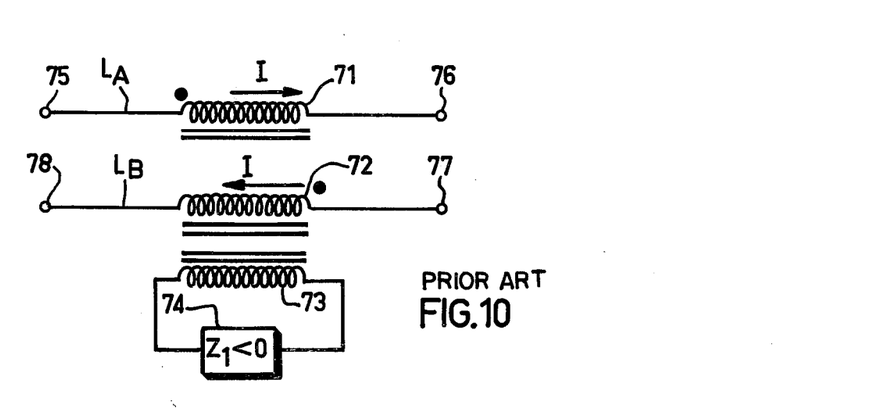
FIG. 10 shows the circuit diagram of a prior art arrangement having two transformer windings which are each provided on one supply wire of a subscriber's set.

The following describes an example of the use of electric networks according to the invention with devices in a subscriber's loop, where it is desired to incorporate transformer windings in series in the loop. Such an arrangement is, for example, the arrangement shown in FIG. 10. The object of this arrangement is to provide an amplifier having a negative series impedance value in a subscriber's loop. This is realized by means of two transformer windings 71 and 72 which are included in the wires which are indicated by $L_A$ and $L_B$ respectively of the loop and a further transformer winding 73 which is connected to the output of the amplifier 74, having a negative impedance $Z_1$. The winding sense of the windings 71 and 72 is opposite and indicated in the customary manner by a dot near one end of each winding. As the supply direct current I of the loop flows through the two windings in the opposite direction, this current I produces a pre-magnetisation in the magnetic circuit of the transformer which results in increased dimensions, and, consequently, in an increased cost price of the transformer.

Figure 11:
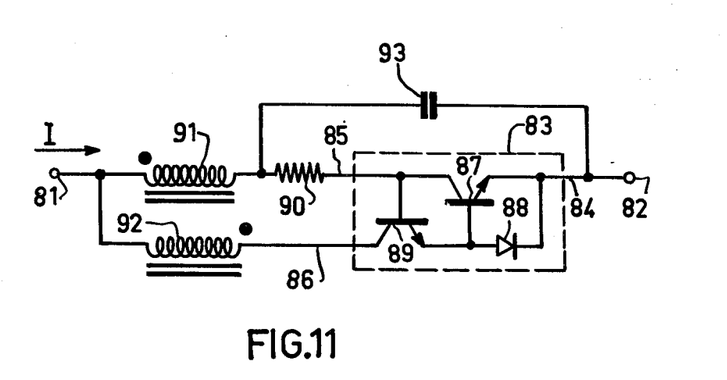
FIG. 11 shows a circuit diagram of an electric network which can be provided instead of each of the transformer windings of FIG. 10

To obviate this drawback each of the two windings and 71 and 72 can be replaced by the electric network, the diagram of which is shown in FIG. 11. This electric network comprises an input terminal 81 and an output terminal 82. The direct current I of the loop flows through the network in the direction from terminal 81 to terminal 82. This network comprises a current mirror 83, a branch 84, which is connected to a terminal 82 and through which the current I flows and which has two branches 85 and 86 which are each passed by currents I/2. In the embodiment shown the current mirror 83 comprises a npn transistor 87 the emitter of which is connected to branch 84, the collector to branch 85 and the base, through a diode 88, to a branch 84. In addition the current mirror 83 comprises an npn transistor 89, the emitter of which is connected to the base of transistor 87, the collector to branch 86 and the base to branch 85. This branch 85 is connected through a low-value resistor 90 to a transformer winding 91, which performs the function of the winding 71 or the winding 72 of FIG. 10. The branch 86 is connected to the compensating winding 92. The other end of the windings 91 and 92 are interconnected and connected to the input terminal 89 of the network. Finally, the network comprises a capacitor 93 which is provided between the branch 84 of the current mirror and the junction of the resistor 90 and the winding 91.

The proper bias voltage of the collector of transistor 89 is obtained by means of the voltage drop produced across the low-value resistor 90. The number of turns of the compensating winding 92 is equal to the number of turns of the winding 91, but of the opposite winding sense (see the dots at both windings). As, due to the current mirror 83, said two windings are passed in the same directions by direct currents I/2 which are of the same value, it is clear that the resulting magnetic flux in the transformer is equal to zero. The current mirror 83 decouples the capacitor 93 for the voice currents so that the voice currents flow through a winding 91 only, so that the compensating winding 92 is inoperative.

Figure 12:
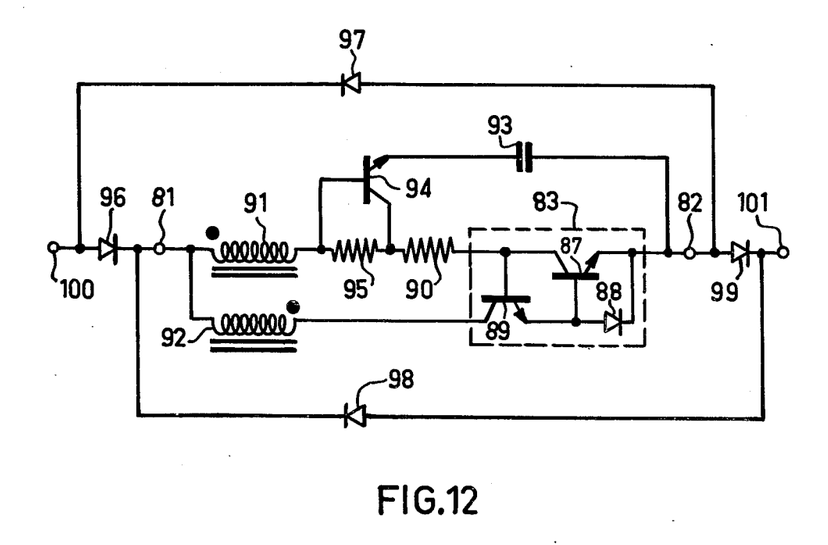
FIG. 12 shows the circuit diagram corresponding to the circuit diagram as shown in FIG. 11 of an electric network according to the invention.

The drawback of the electric network of FIG. 11 is that it causes a distortion of the dialling current pulses owing to the charging and discharging effects of the capacitor 93 in the rhythm of loop interruptions and the corresponding flux variations in the windings 91 and 92. This drawback can be obviated by modifying the electric network of FIG. 11 in accordance with the invention. This modified network is shown in FIG. 12 and comprises between the terminals 81 and 82 all the components of FIG. 11, which have been given the same reference numerals. In addition it comprises a transistor 94 whose collector-emitter path is applied between a terminal of resistor 90 and the capacitor 93. A resistor 95 is provided between said terminal of the resistor 90 and the winding 91. Said resistor 95 is provided between the base and the collector of transistor 94. In the same manner as in the preceding examples the release threshold of the transistor 94 is controlled by the voltage drop between the terminals of the resistor 95.

The electric network of FIG. 12 is furthermore provided with 4 diodes 96 to 99 which are connected in such a way to the terminals 81 and 82 and to the terminals 100 and 101 that the entire circuit of FIG. 12, between the terminals 100 and 101 functions independently of the direction of the current flowing through it.

What is claimed is:

1. An electric network for use in a subscriber's loop, comprising at least two connecting terminals for supplying thereto a current flowing in the subscriber's loop, the network comprising a capacitive element, a switching device arranged in series with the capacitive element, and a threshold device means coupled to the connecting terminals and the switching device for either coupling or not coupling, depending on the polarity and the value of said current, said capacitive element to the connecting terminals of the network.

2. An electric network as claimed in claim 1, wherein the current flowing through the subscriber's loop consists of a supply direct current and a voice current superimposed thereon, the threshold means is adjusted to a value equal to the difference between the maximum value of the supply direct current and the maximum value of the voice current in the subscriber's loop.

3. A electric network as claimed in claim 1 wherein the switching device comprises a transistor having a collector-emitter path means for coupling the capacitive element to the connecting terminals of the network and a base control voltage used as a level detection voltage.

4. An electric network as claimed in claim 3, further comprising a resistor coupled to the base of said transistor wherein the current through the resistor is proportional to the current in the network.

5. A transmission bridge for a subscriber's set, comprising two electric networks as claimed in claim 1 wherein each of the electric networks comprises a first transistor having a collector coupled to a first one of said connecting terminals and a base coupled through a first resistor to said first connecting terminal and to one side of a capacitor, and a second transistor having an emitter-collector path means for coupling an emitter resistor to the other side of the capacitor, the base and the collector of the second transistor being coupled to the ends of a resistor provided between said emitter-resistor of the first transistor and the remaining connecting terminal.

* * * * *